(12) United States Patent
Byford

(10) Patent No.: US 6,626,974 B1
(45) Date of Patent: Sep. 30, 2003

(54) LAURA'S BLEND

(76) Inventor: Leo Byford, 5244 S. Irvington Pl., Tulsa, OK (US) 74135

( * ) Notice: Subject to any disclaimer, the term of this patent is extended or adjusted under 35 U.S.C. 154(b) by 0 days.

(21) Appl. No.: 10/085,877

(22) Filed: May 23, 2002

(51) Int. Cl.[7] ............................... C05F 7/00; C05F 3/00
(52) U.S. Cl. ........................ 71/11; 71/15; 71/21; 71/23; 71/24; 71/20; 71/25
(58) Field of Search ................................ 71/11, 15, 21, 71/23, 25, 24, 20

(56) References Cited

U.S. PATENT DOCUMENTS

| | | | |
|---|---|---|---|
| 4,133,273 A | * 1/1979 | Glennon | 110/346 |
| 4,554,002 A | * 11/1985 | Nicholson | 71/12 |
| 4,872,998 A | * 10/1989 | Dausman et al. | 210/710 |
| 6,281,001 B1 | * 8/2001 | McNelly | 435/262 |

* cited by examiner

*Primary Examiner*—Chhaya Sayala

(57) ABSTRACT

Laura's blend is an organic compost that is blended with ingredients that will meet EPA approval as organic compost. The blending is done to meet requirements for soil condition so as to protect that land from over application of fertilizer. If the customer wants just a standard blended compost then Laura's Blend will be blended to meet the standard application rates as chemical fertilizers, but will be environment friendly.

3 Claims, No Drawings

LAURA'S BLEND

LAURA'S BLEND is a blend of compounds that are blended together to produce an organic fertilizer that is environmental friendly for the applications of organic fertilizers for the enhancement of growth of plants or farm products that require soil treatment. The blend is determined by the ingredients that are needed to enhance the soil conditions, where the applications are to be applied. LAURA'S BLEND is composed of several components that make LAURS' BLEND a organic commercial compose. The arrangement is a follows:

1. CHICKEN, CATTLE, AND PIG WASTE: The high contents of nutriments and natural discharges from these animals can and probably will damage the environment that they exist in and any run off from these locations will have damage to the waters that are in the rivers, lakes, and man made containments that we use for recreation and drinking water.
2. LEVEL 2 SLUDGE: Level two sludge is the result of the filtering that is done to remove the waste and other products that have been allowed to be present in the water that we use for drinking. This sludge that the treatment plants produces is now being applied directly to land as a way of the city to get rid of this material. The EPA (to my understanding) has said that this is to stop and the only place that this sludge is to be deposited is at landfill.
3. GREEN WASTE: Green waste consists of grass, trees, leafs and any components of naturals green products According to information provided by my local landfill, green waste take up over 50% of the landfill
4. PAPER PRODUCTS AND PAPER WASTE AND WOOD WASTE: These products can be used as a filler in the compose. Paper products would consist of things such as boxes, paper bags, newspaper, (after ink removal). Wood Waste would consist of things like railroad ties, saw dust, woods chips.
5. ASH: This material comes from our electric power plants that use coal as a source of energy to make electricity.

All of the above products could be used in LAURA'S BLEND as a single component or as a blended organic compose dependent of testing of the customers soil or as a general organic compose that would be used to replace chemical fertilizers. LAURA'S BLEND can be delivered in the natural blend or pellet form.

I claim:

1. A blend or pellet compost composition consisting of:
   a) the sludge residue after filtration from drinking water treatment plants
   b) chicken litter, swine waste or cattle waste
   c) green waste from trees, grass or leaves
   d) paper waste or wood waste and
   e) coal ash.
2. The composition of claim 1, wherein the paper waste is selected from the group consisting of boxes, paper bags and newspaper.
3. The composition of claim 1, wherein the wood waste is selected from the group consisting of railroad ties, sawdust and wood chips.

* * * * *